(12) United States Patent
Miyamoto et al.

(10) Patent No.: US 8,991,347 B2
(45) Date of Patent: Mar. 31, 2015

(54) STARTING DEVICE OF SPARK-IGNITION MULTI-CYLINDER ENGINE

(71) Applicant: Mazda Motor Corporation, Aki-gun, Hiroshima (JP)

(72) Inventors: Keiichi Miyamoto, Higashihiroshima (JP); Kouji Shishime, Hiroshima (JP); Yoshitaka Wada, Hiroshima (JP); Tatsuya Takahata, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 14/154,042

(22) Filed: Jan. 13, 2014

(65) Prior Publication Data

US 2014/0202407 A1 Jul. 24, 2014

(30) Foreign Application Priority Data

Jan. 23, 2013 (JP) ................................. 2013-010326

(51) Int. Cl.
| | |
|---|---|
| F01L 1/34 | (2006.01) |
| F02N 11/08 | (2006.01) |
| F01L 1/344 | (2006.01) |
| F01L 1/24 | (2006.01) |
| F01L 1/18 | (2006.01) |
| F01L 1/053 | (2006.01) |

(52) U.S. Cl.
CPC ............... *F02N 11/08* (2013.01); *F01L 1/3442* (2013.01); *F01L 1/185* (2013.01); *F01L 1/24* (2013.01); *F01L 2001/0537* (2013.01); *F01L 2105/00* (2013.01); *F01L 2250/02* (2013.01); *F01L 2250/06* (2013.01); *F01L 2800/01* (2013.01)

USPC .................. 123/90.17; 123/90.12; 123/90.15; 464/160

(58) Field of Classification Search
USPC .................. 123/90.12, 90.15, 90.17; 464/160
See application file for complete search history.

(56) References Cited

U.S. PATENT DOCUMENTS

| | | | | |
|---|---|---|---|---|
| 7,789,051 B2 * | 9/2010 | Nakamura | ................. | 123/90.15 |
| 2011/0232605 A1 | 9/2011 | Ashizawa | | |

FOREIGN PATENT DOCUMENTS

| | | |
|---|---|---|
| JP | 2004301078 A | 10/2004 |
| JP | 2009041460 A | 2/2009 |

* cited by examiner

*Primary Examiner* — Ching Chang
(74) *Attorney, Agent, or Firm* — Alleman Hall McCoy Russell & Tuttle LLP

(57) ABSTRACT

A starting device of a spark-ignition multi-cylinder engine is provided. The device includes a multi-cylinder engine body having cylinders, fuel injection valves, ignition plugs, an intake valve drive mechanism for opening and closing intake valves, a hydraulic variable valve phase mechanism for changing a close timing of each intake valve, an engine-driven hydraulic pressure supply source for supplying a hydraulic pressure, and a start controller for controlling the fuel injection valves, the ignition plugs, and the variable valve phase mechanism. When the supplied hydraulic pressure is below a predetermined pressure, the variable valve phase mechanism locks the close timing. When an engine temperature in an engine-start is high, the start controller retards a fuel injection timing of the cylinder on intake stroke at an engine stopped timing and retards an ignition timing thereof. The start controller does not retard the close timing of the intake valve until the engine-start completes.

11 Claims, 6 Drawing Sheets

STARTING DEVICE OF SPARK-IGNITION MULTI-CYLINDER ENGINE

BACKGROUND

The present invention relates to a starting device of a spark-ignition multi-cylinder engine.

For example, JP2004-301078A discloses an engine starting device for automatically starting (i.e., restarting), when an engine has automatically stopped since a predetermined stopping condition is satisfied, the engine when a predetermined starting condition is satisfied. In order to promptly start the engine, the starting device firstly performs injections of fuel and ignitions inside cylinders which are respectively on expansion stroke and compression stroke at an engine stopped timing, so as to rotate the engine in a normal rotating direction. Subsequently, the starting device also performs injections of fuel and ignitions inside cylinders which are respectively on intake stroke and exhaust stroke at the engine stopped timing and will be on the compression stroke after the respective strokes. However, when restarting the engine, since a temperature of the engine is comparatively high, a temperature of air inside the cylinder on the intake stroke at the engine stopped timing becomes comparatively high. Therefore, the temperature inside the cylinder increases to be extremely high as the compression of the air inside the cylinder progresses on the compression stroke, and the fuel injected into the cylinder may pre-ignite near a compression top dead center (CTDC). Thus, the starting device in JP2004-301078A prevents such pre-ignition by controlling a fuel injection into the cylinder which is on the intake stroke at the engine stopped timing, in a manner that the fuel injection thereto is prohibited or, during the compression stroke, retarded more than a normal timing.

Moreover, JP2009-041460A discloses an engine automatic starting device which divides fuel to be injected and injects, during intake stroke, the divided fuel into a cylinder which is on the intake stroke at an engine stopped timing, so as to improve homogeneity of the fuel. Thus, the automatic starting device prevents pre-ignition similarly to JP2004-301078A.

Note that, pre-ignition produced in an engine start causes a disadvantage of generating vibration.

Meanwhile, there are engines each having a valve phase variable mechanism for changing the open and close timings of an intake valve. With such an engine, especially when the valve phase variable mechanism is driven by a hydraulic pressure supplied from an engine-driven hydraulic pressure supply source, a predetermined hydraulic pressure cannot be obtained at least in an early stage of the engine start. Therefore, the intake valve is locked to close at a predetermined timing. Note that, the phrase "engine start" herein includes a force start due to a key-on operation by a driver, in addition to a restart after the engine is automatically stopped because a predetermined stopping condition is satisfied. Specifically, in order to achieve a cold-start of the engine, the locked timing of the intake valve may be set to correspond to a close timing which achieves a comparatively high effective compression ratio, in other words, it may be set so that the intake valve is closed at a timing corresponding relatively near to an intake bottom dead center (IBDC) of compression stroke. Note that, the effective compression ratio is a ratio between an in-cylinder volume when the intake valve is closed and an in-cylinder volume when a piston of the cylinder is at the TDC (i.e., a volume of a combustion chamber).

However, in the case where the locked timing of the hydraulic valve phase variable mechanism is set to have the comparatively high effective compression ratio, if the engine start is attempted with a comparatively high engine temperature, a gas temperature and pressure in the end of the compression stroke increase due to an increased in-cylinder temperature and the comparatively high effective compression ratio described above, resulting in a disadvantage of easily causing pre-ignition.

In this regard, as disclosed in JP2004-301078A and JP2009-041460A, devising the mode of the fuel injection into the cylinder is, although effective in avoiding pre-ignition to some extent, but causes degradation in the engine starting performance because the torque in starting the engine may decrease. Particularly, when restarting the engine after the automatic stop, pre-ignition easily occurs on one hand due to the comparatively high engine temperature and the comparatively high effective compression ratio, while a prompt engine start is required on the other hand.

SUMMARY

The present invention is made in view of the above situations and achieves both pre-ignition avoidance and a prompt start when starting a spark-ignition multi-cylinder engine.

The present invention is directed to a starting device of a spark-ignition multi-cylinder engine. The starting device includes a multi-cylinder engine body including a plurality of cylinders each having a piston reciprocatably fitted therein. The starting device also includes fuel injection valves for injecting fuel into the respective cylinders. The starting device also includes ignition plugs for igniting mixture gas inside the respective cylinders. The starting device also includes an intake valve drive mechanism for opening and closing intake valves for introducing intake air into the respective cylinders, synchronized with the reciprocations of the respective pistons. The starting device also includes a hydraulic variable valve phase mechanism for changing a close timing of each of the intake valves between a predetermined most advanced timing and a predetermined most retarded timing after an intake bottom dead center. The starting device also includes an engine-driven hydraulic pressure supply source for supplying a predetermined hydraulic pressure to the variable valve phase mechanism. The starting device also includes a start controller for controlling the fuel injection valves, the ignition plugs, and the variable valve phase mechanism in an engine start.

When the supplied hydraulic pressure is lower than a predetermined value, the variable valve phase mechanism locks the close timing of the intake valve to a predetermined timing that is between the most advanced timing and the most retarded timing and enables a cold start of the engine. When the engine in the engine start is in a high temperature state in which a temperature thereof is higher than a predetermined temperature, the start controller performs retard-setting on the cylinder that is on the intake stroke at an engine stopped timing among the plurality of cylinders to set a fuel injection timing thereof to an early stage of expansion stroke, and the start controller retards an ignition timing of the cylinder to a timing in the early stage of the expansion stroke and after the fuel injection is completed.

Even after the engine start begins and the hydraulic pressure supplied to the variable valve phase mechanism exceeds the predetermined value, the start controller performs non-retard-setting on the intake valve to set the close timing thereof to the predetermined timing or earlier until the engine start is completed.

Here, the phrase "the early stage of the expansion stroke" may be the early stage of the expansion stroke when, for example, the expansion stroke is divided into four stages of early, early-middle, middle and final stages. Moreover, the phrase "the close timing of the intake valve is set to the predetermined timing or earlier" includes keeping the close timing of the intake valve to the predetermined timing and advancing the close timing of the close timing of the intake valve than the predetermined timing. That is, since an effective compression ratio is reduced when the close timing of the intake valve set to be after the intake bottom dead center is retarded than the predetermined timing, with the above configuration, the effective compression ratio is maintained or increased by not retarding than the predetermined timing of the close timing of the intake valve which is set to be after the intake bottom dead center.

According to this configuration, the variable valve phase mechanism of the intake valve locks the close timing of the intake valve to the timing (intermediate timing) between the most advanced timing and the most retarded timing after the intake bottom dead center. Since the locked timing corresponds to the predetermined timing enabling the cold start of the engine, the effective compression ratio becomes comparatively high in the engine start in which the predetermined hydraulic pressure is not supplied to the variable valve phase mechanism and the close timing of the intake valve is locked to the predetermined timing.

When the engine in the engine start is in the high temperature state in which the temperature thereof is higher than the predetermined temperature, due to the comparatively high effective compression ratio as described above, pre-ignition easily occurs. Therefore, the start controller performs retard-setting on the cylinder which is on the intake stroke at the engine stopped timing among the plurality of cylinders to set particularly the first fuel injection timing thereof to the timing in the early stage of the expansion stroke and after the compression top dead center. In the cylinder which is on the intake stroke at the engine stopped timing, although high-temperature intake air is compressed in the engine start and a compression end temperature increases, by not injecting the fuel into the cylinder during the compression stroke, pre-ignition during the compression stroke can surely be avoided. By then performing the ignition at the timing in the early stage of the expansion stroke and after the fuel injection is completed, the combustion is started. As described above, since the temperature of the engine is comparatively high and the effective compression stroke is comparatively high, the fuel injected into the cylinder at the timing in the early stage of the expansion stroke can smoothly vaporize and atomize. As a result, the ignition and the combustion can be performed at respective comparatively early timings on the expansion stroke. This increases a starting torque and is advantageous in a prompt start.

Here, the start controller may perform the fuel injections and the ignitions of the plurality of cylinders sequentially in the engine start (the start herein includes, not only an engine automatic start after an engine automatic stop, in other words, a restart, but also a force start). Specifically, the starting device may firstly perform the injections of the fuel and the ignitions inside the cylinders which are respectively on expansion stroke and compression stroke at the engine stopped timing, and subsequently, the starting device may also perform the injections of the fuel and the ignitions inside the cylinders which are respectively on the intake stroke and the exhaust stroke at the engine stopped timing and will be on the compression stroke after the respective strokes. In this case, the cylinder on the intake stroke at the engine stopped timing compresses high-temperature air inside the cylinder, and therefore, pre-ignition easily occurs. Therefore, as described above, the retard-setting of the timing of the first fuel injection into the cylinder to the early stage of the expansion stroke is preferred in view of avoiding pre-ignition. Moreover, since the cylinder on the exhaust stroke at the engine stopped timing shifts to the compression stroke subsequently to the cylinder which is on the intake stroke at the engine stopped timing, the cylinder on the exhaust stroke may also be introduced therein with high-temperature air and compress it. Therefore, also for the cylinder on the exhaust stroke at the engine stopped timing, the retard-setting of the timing of the first fuel injection thereinto to the early stage of the expansion stroke may be performed.

The starting device of the spark-ignition multi-cylinder engine may also include a starter motor for cranking the engine. When the engine in the engine start is in the high temperature state and a piston stopped position of the cylinder that is on compression stroke at the engine stopped timing is on a bottom dead center side with respect to a middle point of the compression stroke, the start controller may perform retard-setting on the cylinder that is on the compression stroke among the plurality of cylinders to set a fuel injection timing thereof to a timing in the early stage of the expansion stroke and after a compression top dead center, and the start controller may retard an ignition timing of the cylinder to a timing in the early stage of the expansion stroke and after the fuel injection is completed. The start controller may also drive the starter motor.

When the stopped position of the piston in the cylinder on the compression stroke at the engine stopped timing is on the bottom dead center side with respect to the middle point of the compression stroke, in the engine start, the temperature inside the cylinder increases as the compression of the air inside the cylinder in the middle of the compression stroke process proceeds. Thus, there is a possibility of causing pre-ignition if the fuel is injected into this cylinder during the compression stroke. Therefore, according to the piston stopped position of the cylinder on the compression stroke at the engine stopped timing, when the piston stopped position is on the bottom dead center side with respect to the middle point of the compression stroke, the retard-setting is performed on the cylinder on the compression stroke to set the fuel injection timing thereof to the timing in the early stage of the expansion stroke after the compression top dead center, and the ignition timing thereof is retarded to the timing in the early stage of the expansion stroke and after the fuel injection is completed. Thereby, pre-ignition can surely be avoided as describe above.

Whereas, since the first combustion of the cylinder which is on the compression stroke at the stopped timing is performed after the early stage of the expansion stroke, the torque may decrease when, particularly, the engine start begins. Therefore, the start controller drives the starter motor to assist the engine start. Thereby, the engine is promptly and surely started.

The intake valve drive mechanism may have a hydraulic lash adjuster for adjusting a valve clearance of the intake valve by being supplied with the hydraulic pressure from the hydraulic pressure supply source. The start controller may cancel the retard-setting of the fuel injection timing after the engine start begins and oil is supplied to the hydraulic lash adjuster.

When the oil is not supplied to the hydraulic lash adjuster, so-called sinking of the hydraulic lash adjuster occurs and increases a valve clearance, and as a result, a lift of the intake valve is reduced entirely. The reduced lift shortens the open period of the intake valve and substantially advances the close timing set to after the intake bottom dead center. Thus, the effective compression ratio of the cylinder increases and pre-ignition is easily caused. Therefore, before the oil is supplied to the hydraulic lash adjuster in the engine start, the start controller retards the fuel injection timing of the cylinder which is on the intake stroke at the engine stopped timing among the plurality of cylinders, as described above. Thus, the pre-ignition is effectively avoided. On the other hand, after the hydraulic lash adjuster is supplied with the oil, the sinking of the hydraulic lash adjuster is eliminated and, thus, the substantial close timing of the intake valve is correspondingly retarded (specifically, the timing at which the sinking of the hydraulic lash adjuster is eliminated is after the intake valve lifts up once because, due to the structure of the hydraulic lash adjuster, the sinking of the hydraulic lash adjuster is eliminated by the oil supply after the intake valve lifts up once). The retarding of the substantial close timing of the intake valve causes a decrease of the effective compression ratio of the cylinder and is advantageous in avoiding pre-ignition. Therefore, the retard-setting of the fuel injection timing described above is canceled. Specifically, the fuel injection timing is advanced and the ignition timing is also accordingly advanced so as to increase the starting torque, which is advantageous in the prompt engine start.

Note that, in a state where the temperature of the intake air to be introduced into the cylinders is reduced and the occurrence of pre-ignition is suppressed by performing the fuel injections and the ignitions on two or more of the plurality of cylinders and introducing the intake air into two or more of the plurality of cylinders after the engine start begins, the retard-setting of the fuel injection timing (i.e., injecting the fuel in the early stage of the expansion stroke) may be canceled even before the oil is supplied to the hydraulic lash adjuster. In this case, the fuel injection timing may be set to, for example, a final stage of the compression stroke (i.e., the final stage when the compression stroke is divided into the four stages of early, early-middle, middle and final stages). Thereby, the engine can be started more promptly while surely avoiding the occurrence of pre-ignition.

The start controller may keep the close timing of the intake valve to the predetermined timing until the engine start is completed.

Even after the engine start begins and the hydraulic pressure is supplied to the variable valve phase mechanism, until the engine start is completed, the close timing of the intake valve is kept to the predetermined timing. Specifically, with the above configuration, since pre-ignition is avoided by setting the fuel injection timing to the early stage of the expansion stroke, there is no need to reduce the effective compression ratio by operating the variable valve phase mechanism in order to avoid pre-ignition. On the contrary, by keeping the close timing of the intake valve to the predetermined timing without operating the variable valve phase mechanism, the comparatively high effective compression ratio is maintained, and thus, the starting torque is increased, which is advantageous in the prompt engine start.

After the engine is automatically stopped under a predetermined condition, the start controller may perform the retard-setting of the fuel injection timing and the non-retard-setting of the close timing of the intake valve when automatically starting the engine due to a satisfaction of a predetermined condition.

In the engine automatic start after the engine automatic stop, since the temperature of the engine is comparatively high, the compression end temperature is increased and there is a possibility of causing pre-ignition. The retard-setting of the fuel injection timing as described above can effectively avoid the occurrence of pre-ignition in the engine automatic start. Additionally, by the non-retard-setting in which the close timing of the intake valve is set to the predetermined timing or earlier, the comparatively high effective compression ratio is kept during the engine automatic start, and thus, the engine prompt start can be achieved.

DETAILED DESCRIPTION OF EMBODIMENT

Figure 1:
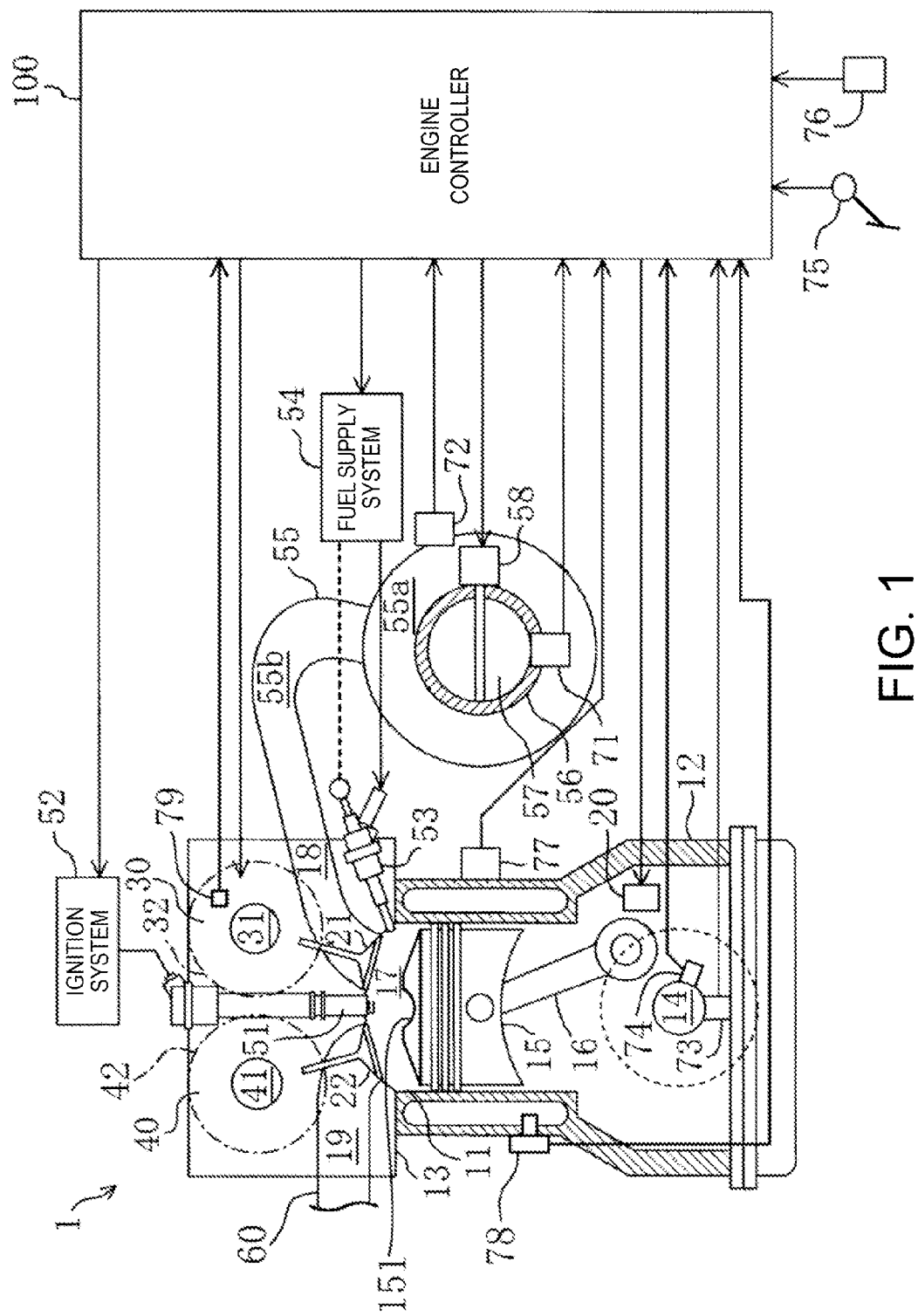
FIG. 1 is a schematic diagram illustrating a configuration of a spark-ignition multi-cylinder engine and a control device thereof.

Hereinafter, a starting device of a spark-ignition multi-cylinder engine according to one embodiment of the present invention is described with reference to the accompanying drawings. Note that, the following description is merely an example. As illustrated in FIG. 1, an engine system includes an engine 1, various actuators associated with the engine 1, various sensors, and an engine controller 100 for controlling the actuators based on signals transmitted from the sensors, respectively. The engine 1 of the engine system is a high-compression-ratio engine of which a geometric compression ratio is between 13:1 and 20:1 (e.g., 14:1).

The engine 1 is a spark-ignition four-cycle engine. Although only one cylinder is illustrated in FIG. 1, the engine has four cylinders including first to fourth cylinders 11 arranged in line. Note that, engines to which the art disclosed herein is applicable is not limited to inline four-cylinder engines. The engine 1 is installed in a vehicle (e.g., automobile), and its output shaft is coupled to driving wheels via a transmission (not illustrated). The output of the engine 1 is transmitted to the driving wheels and, thus, the vehicle is driven.

The engine 1 includes a cylinder block 12 and a cylinder head 13 arranged on the cylinder block 12. The cylinders 11 are formed inside the cylinder block 12. As it is well-known, a crankshaft 14 is rotatably supported in the cylinder block 12 by journals and bearings. The crankshaft 14 is coupled to pistons 15 via connecting rods 16, respectively.

A ceiling of each cylinder 11 is formed with two inclining surfaces extending from the substantial center of the ceiling to near a lower end face of the cylinder head 13, so as to form a roof shape in which the inclining surfaces are leaning on each other, a so called pent-roof shape.

Each piston 15 is reciprocatably fitted into the cylinder 11 to form a combustion chamber 17 in cooperation with the cylinder 11 and the cylinder head 13. A top face portion, i.e., top surface, of the piston 15 is formed into a trapezoid bulging from its circumferential edge section toward its center to correspond to the pent-roof shape of the ceiling of the cylinder 11. Thus, a combustion chamber volume when the piston 15 reaches a CTDC is reduced to achieve a high geometric compression ratio of 13:1 or higher. The substantial center of the top face of the piston 15 is formed with a cavity 151 to be concaved in a substantially spherical shape. The cavity 151 is formed to oppose an ignition plug 51 disposed on a central part of the cylinder 11 above the cavity, so as to shorten a combustion period. Specifically, as described above, the high-compression ratio engine 1 has the piston 15 with the bulged top face so that when the piston 15 reaches the CTDC, a gap between the top face of the piston 15 and the ceiling of the cylinder 11 becomes extremely small. Therefore, in a case where the cavity 151 is not formed, an initial flame is interfered by the top face of the piston 15, and as a result, a cooling loss increases and, thus, flame propagation is interrupted and a combustion speed decelerates. Whereas, with the cavity 151, it avoids the interference on the initial flame and does not prevent its growth, and thus, the flame propagation speed increases and the combustion period can be shortened. These are advantageous in suppressing knocking and contribute in an increase of torque by an advanced ignition timing.

An intake port 18 and an exhaust port 19 are formed for each cylinder 11 in the cylinder head 13, and each port is communicated with the combustion chamber 17. An intake valve 21 and an exhaust valve 22 are arranged to shutoff (close) the intake port 18 and the exhaust port 19 respectively from the combustion chamber 17. The intake and exhaust valves 21 and 22 are driven by an intake valve drive mechanism 30 and an exhaust valve drive mechanism 40, respectively. Thus, the intake and exhaust valves 21 and 22 reciprocate at respective predetermined timings to open and close the intake and exhaust ports 18 and 19.

The intake valve drive mechanism 30 and the exhaust valve drive mechanism 40 have an intake camshaft 31 and an exhaust camshaft 41, respectively. The camshafts 31 and 41 are coupled to the crankshaft 14 via a well-known power transmitting mechanism (e.g., chain/sprocket mechanism). As it is well-known, the power transmitting mechanism performs one full rotation of the camshaft 31 and 41 while performing two full rotations of the crankshaft 14.

Figure 2:
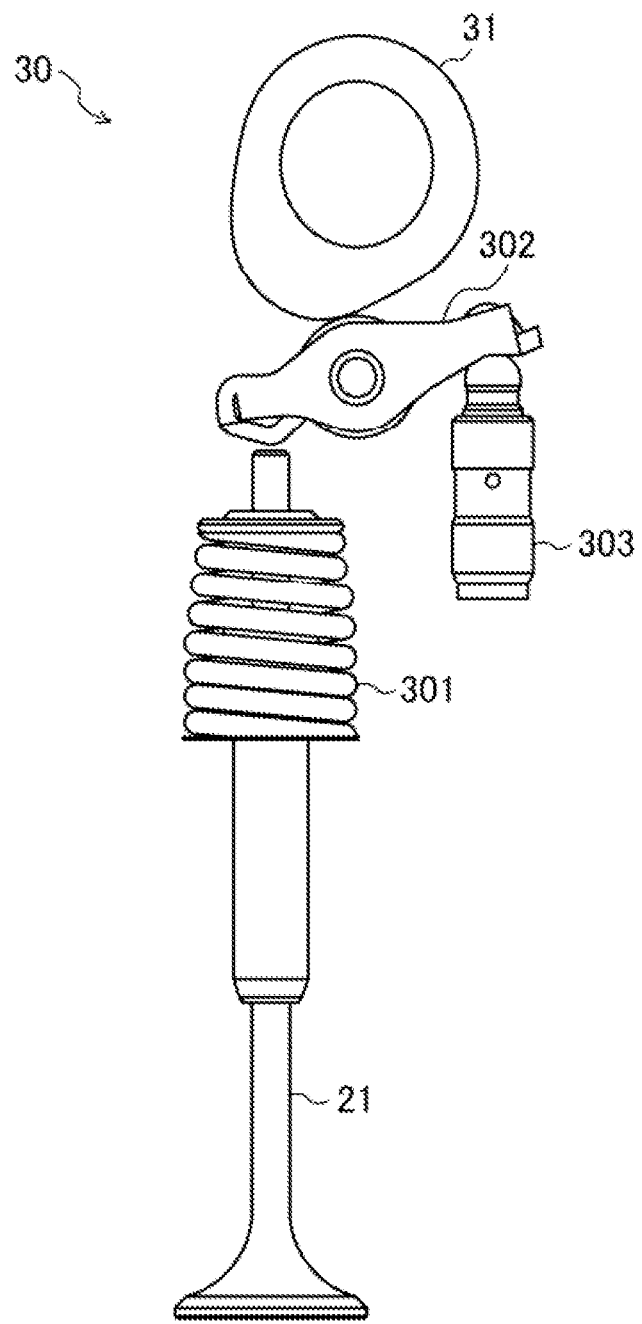
FIG. 2 is a view illustrating a configuration of a drive mechanism of an intake valve.

FIG. 2 illustrates the configuration of the intake valve drive mechanism 30 more in detail. Note that, since the exhaust valve drive mechanism 40 has a similar configuration to the intake valve drive mechanism 30, the description thereof is omitted below. The intake valve drive mechanism 30 is configured as a rocker arm type, including a swing arm. Note that, although the intake valve 21 is illustrated in FIG. 2 such that a shaft thereof extends in up-and-down directions of the drawing (in a central axis of the cylinder 11), the intake valve 21 is arranged inside the cylinder head 13 obliquely with respect to a central axis of the cylinder 11.

The intake valve 21 is normally pressed to be biased upward (in a valve closing direction) by a coil spring 301. As the intake valve 21 is driven by the intake camshaft 31 via a swing-arm-type rocker arm 302, it is pushed down against a pressing force of the spring 301.

The rocker arm 302 is a roller rocker arm having a roller disposed at a contacting surface with the cam, and is arranged to extend in a width direction of the engine 1. Between both end parts of the rocker arm 302 in a longitudinal direction, the end part comparatively closer to the center of the cylinder (end part on the left side of the drawing in FIG. 2) pushes down the end of the shaft of the intake valve 21, while the other end part of the rocker arm 302 is pivotably supported by an end pivot manner.

The end pivot is configured with a hydraulic lash adjuster (HLA) 303. Although a detailed illustration of the HLA 303 is omitted since the configuration thereof is well known, the HLA 303 is supplied with oil and adjusts a valve clearance to be zero. Specifically, the HLA 303 extends by being supplied with the oil, so as to turn the rocker arm 302 in a counter clockwise direction in FIG. 2, and thus, the clearance between the end part of the rocker arm 302 and the end of the shaft of the intake valve 21 is adjusted to zero.

Figure 3:
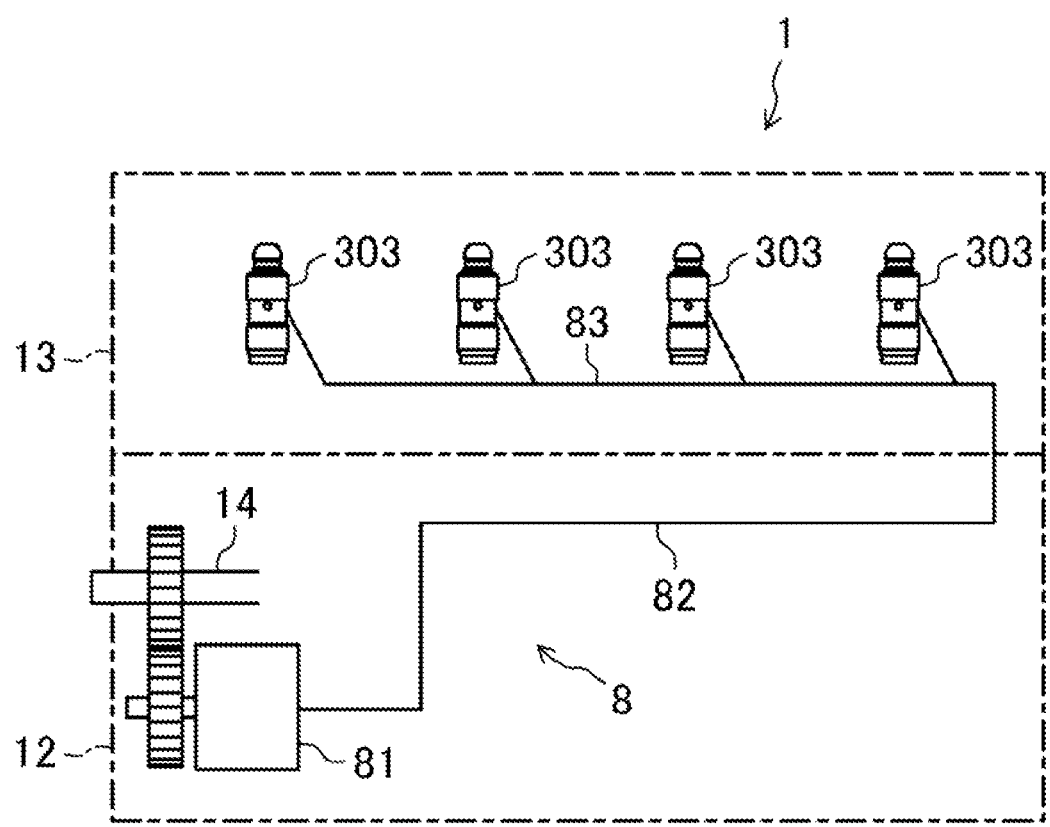
FIG. 3 is a conceptual diagram illustrating a supply circuit configuration for a hydraulic pressure to be supplied to an HLA.

FIG. 3 conceptually illustrates a supply circuit 8 of a hydraulic pressure to be supplied to the HLA 303. The HLA 303 of the intake valve 21 of the cylinder 11 is supplied with oil from an oil pump 81 coupled to be driven by the crankshaft 14 of the engine 1, through a main oil gallery 82 provided inside the cylinder block 12 and a sub oil gallery 83 provided inside the cylinder head 13. Due to the structure of the HLA 303, the HLA 303 extends by the engine oil filled into an oil chamber inside the HLA 303 after the intake valve 21 opens once. Therefore, when an engine start begins, the HLA 303 is not extended because the oil in the oil chamber of the HLA 303 is drained, and after the intake valve 21 is opened once thereafter, the HLA 303 extends. Therefore, when the HLA 303 is not extended in the engine start (hereinafter, this state of the HLA 303 may be referred to as sinking of the HLA 303), the valve clearance increases and, as a result, a lift of the intake valve 21 becomes generally smaller, and an open period of the intake valve 21 becomes substantially shorter.

The intake valve drive mechanism 30 includes an intake valve phase variable mechanism 32 for changing open and close timings of the intake valve 21. The exhaust valve drive mechanism 40 includes an exhaust valve phase variable mechanism 42 for changing open and close timings of the exhaust valve 22. In this embodiment, the intake valve phase variable mechanism 32 is comprised of a hydraulic phase variable mechanism (Variable Valve Timing: VVT) which is able to continuously change a phase of the intake camshaft 31 within a predetermined angle range. The exhaust valve phase variable mechanism 42 is comprised of a VVT which is able to continuously change a phase of the exhaust camshaft 41 within a predetermined angle range. The intake valve phase variable mechanism 32 can adjust an effective compression ratio by changing the close timing of the intake valve 21.

Figure 4:
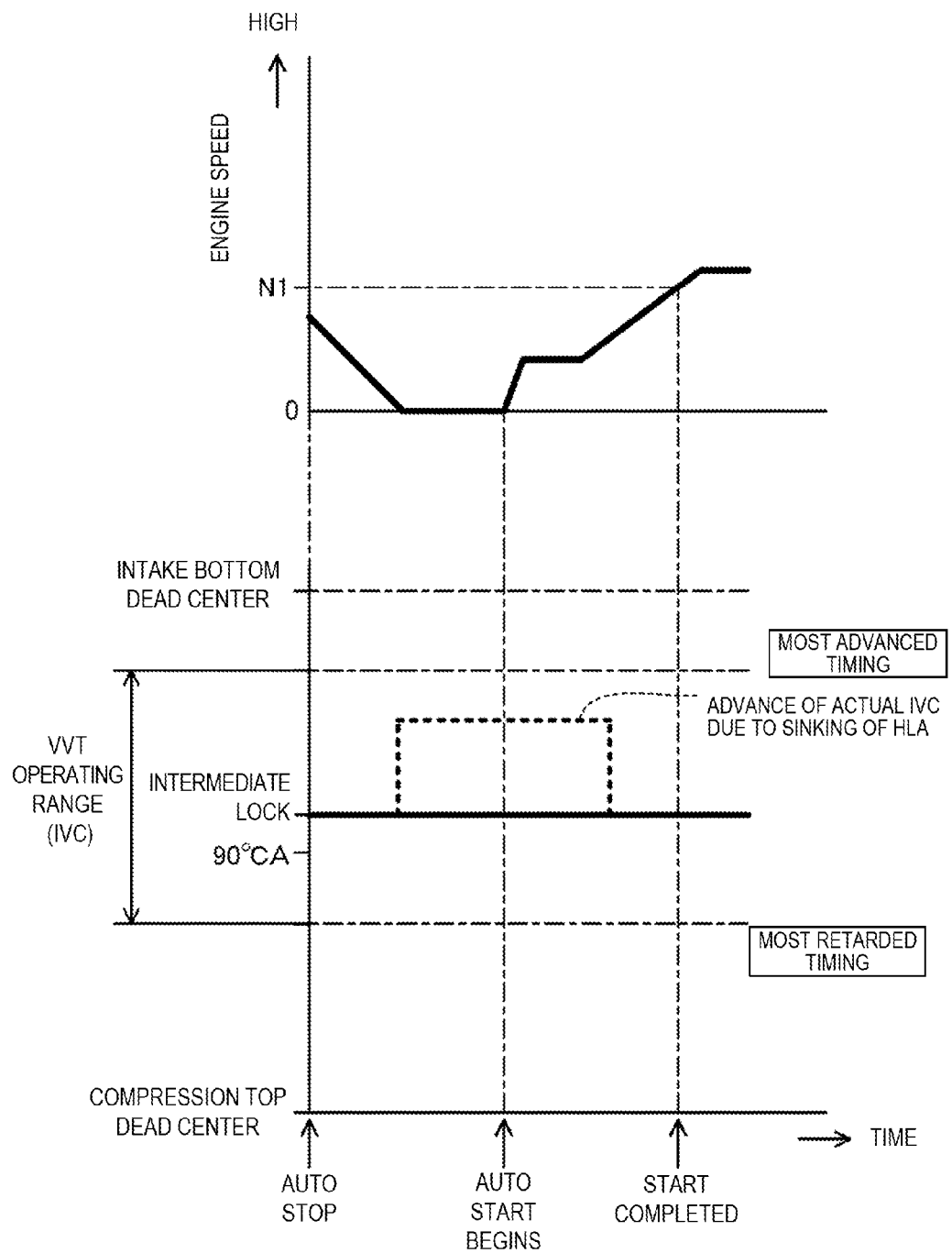
FIG. 4 shows charts illustrating one example of a change of an engine speed and a change of an intake valve close timing in a period from an automatic stop to an automatic start of the engine.

Specifically, the intake valve phase variable mechanism 32 changes the close timing of the intake valve 21 between a predetermined most advanced timing and a predetermined most retarded timing after an IBDC, as indicated by "VVT operating range" in FIG. 4. The most advanced timing is, for example, set to between 30 to 50° CA ABDC, and the most retarded timing is, for example, set to between 100 to 120° CA ABDC. Note that, the valve close timing is defined as the lift of 1 mm (same below).

Moreover, the intake valve phase variable mechanism 32 (not illustrated in detail) operates by being supplied with the hydraulic pressure from the engine-driven oil pump 81. When the supplied hydraulic pressure is below a predetermined value, the intake valve phase variable mechanism 32 locks the close timing of the intake valve 21 to a predetermined intermediate locked timing between the most advanced timing and the most retarded timing. To enable a cold-start of the engine 1, this intermediate locked timing corresponds to the close timing which makes the effective compression ratio comparatively high, and is set on the BDC side (e.g., between 70 to 90° CA ABDC) with respect to the middle point of the compression stroke (90° CA) as illustrated in FIG. 4.

Here, as described above, when the HLA 303 is in the sunken state, since the open period of the intake valve 21 is substantially short, the close timing of the intake valve 21 set to after the IBDC substantially advances. The advance amount is about 30° CA, etc. In the engine start in which the HLA 303 is in the sunken state, as a result of the close timing of the intake valve 21 advancing than the intermediate locked timing of the intake valve phase variable mechanism 32, the effective compression ratio increases more.

Returning back to FIG. 1, a fuel injection valve 53 has a well-known structure using, for example, a bracket, and is attached to one side (intake side in FIG. 1) of the cylinder head 13 in this embodiment. The engine 1 is a direct-injection engine which directly injects fuel into the cylinder 11, and a tip of the fuel injection valve 53 is positioned below the intake port 18 in an up-and-down axis and in a circumferential section of the cylinder 11 in a left-and-right axis to be oriented toward inside the combustion chamber 17. Note that, the arrangement of the fuel injection valve 53 is not limited to this. In this embodiment, the fuel injection valve 53 is a multi-hole (e.g. six holes) fuel injection valve (MHI). Although the orientation of each hole is not illustrated, the hole spreads toward an external opening end of the hole in its axis so that the fuel can be injected to spread entirely into the cylinder 11. The MHI is advantageous in that the fuel can be injected at a comparatively high pressure because a diameter of a single hole is small due to the injector having the multiple holes, and that the mixing performance of the fuel is improved and vaporization and atomization of the fuel are promoted since the hole spreads in order to inject the fuel to spread entirely into the cylinder 11. Therefore, when the fuel is injected on the intake stroke, the MHI is advantageous in view of improving the mixing performance of the fuel utilizing an intake flow inside the cylinder 11, and the promotion of the vaporization and atomization of the fuel. Whereas, when the fuel is injected on the compression stroke, the MHI is advantageous in view of cooling inside the cylinder 11 with gas due to the promoted vaporization and atomization of the fuel. Note that, the fuel injection valve 53 is not limited to the MHI.

A fuel supply system 54 includes a high-pressure pump (fuel pump) for increasing a pressure of the fuel and supplying it to the fuel injection valve 53, piping and/or a hose for supplying the fuel from the fuel tank to the high-pressure pump, and an electric circuit for driving the fuel injection valve 53. The fuel pump is driven by the engine 1 in this embodiment. Note that, the fuel pump may be an electric pump. When the fuel injection valve 53 is the multi-hole type, the fuel injection pressure is set comparatively high so as to inject the fuel from the tiny holes. The electric circuit receives a control signal from the engine controller 100 and operates the fuel injection valve 53 to inject a predetermined amount of fuel into the combustion chamber 17 at a predetermined timing. Here, the fuel supply system 54 sets the fuel pressure high according to an increase of the engine speed. In addition to the amount of the fuel to be injected into the cylinder 11 increasing according to the engine speed increase, the increased fuel pressure is advantageous in vaporizing and atomizing the fuel and shortening a pulse width according to the fuel injection of the fuel injection valve 53 as much as possible.

The intake port 18 is communicated with a surge tank 55a by an intake path 55b inside an intake manifold 55. An intake flow from an air cleaner (not illustrated) passes through a throttle body 56 and leads to the surge tank 55a. A throttle valve 57 is disposed in the throttle body 56, and the throttle valve 57, as well-known, throttles the intake flow toward the surge tank 55a to adjust the flow rate thereof. A throttle actuator 58 receives a control signal from the engine controller 100 and adjusts an opening of the throttle valve 57.

The exhaust port 19 is, as well known, communicated with a passage inside an exhaust pipe by an exhaust path inside an exhaust manifold 60. The exhaust manifold 60 is, although it is not illustrated, structured such that branched exhaust passages each connected to the exhaust port 19 of each cylinder 11 are formed, the branched exhaust passages connected with cylinders of which exhausting order is not adjacent to each other merge in the first manifold sections respectively, intermediate exhaust passages are formed downstream of the respective first manifold sections, and the intermediate exhaust passages merge in a second manifold section. In other words, a so-called 4-2-1 layout is adopted for the exhaust manifold 60 of the engine 1.

Also, the engine 1 is provided with a starter motor 20 for performing cranking in the engine start.

The engine controller 100 is a controller mainly configured with a well-known microcomputer, which includes a central processing unit (CPU) for executing programs, a memory constituted with, for example, a RAM and a ROM and for storing programs and data, and an input/output (I/O) bus for inputting and outputting electric signals.

The engine controller 100 receives various inputs including an intake flow rate and an intake air temperature from an airflow sensor 71, an intake manifold pressure from an intake air pressure sensor 72, crank angle pulse signals from two crank angle sensors 73 and 74 of which phases are offset from each other by a fixed amount, a cam angle signal from a cam angle sensor 79 provided to the camshaft, and an engine water temperature from a water temperature sensor 78. The engine controller 100 calculates the engine speed based on the crank angle pulse signals, etc. Moreover, the engine controller 100 performs a detection of a stopped position of the piston 15 and a cylinder identification based on the crank angle pulse signals from the two crank angle sensors 73 and 74, and the cam angle signal. The engine controller 100 receives an accelerator opening signal from an accelerator opening sensor 75 for detecting a pressed amount of an accelerator. Moreover, the engine controller 100 is inputted with a vehicle speed signal from a vehicle sensor 76 for detecting a rotational speed of an output shaft of a transmitter. In addition, the cylinder block 12 is attached with a knock sensor 77 comprised of an acceleration sensor for converting vibration of the cylinder block 12 into a voltage signal and outputting it, and the voltage signal is also inputted to the engine controller 100.

Based on the inputs as described above, the engine controller 100 calculates the following control parameters of the engine 1, such as, a target throttle opening signal, a target fuel injection pulse, a target ignition signal, and a target valve phase angle signal. Further, the engine controller 100 outputs these signals to, for example, the throttle actuator 58, the fuel supply system 54, an ignition system 52, and the intake and exhaust valve phase variable mechanisms 32 and 42. The engine controller 100 also outputs a drive signal to the starter motor 20 in the engine start.

(Automatically Stopping Control and Automatically Starting Control of Engine)

When a predetermined engine stop condition is satisfied, the engine system stops the fuel injection from the fuel injection valve 53 and stops the igniting operation of the ignition plug 51 so as to automatically stop the engine 1. Moreover, when a predetermined engine restart condition is satisfied after the engine automatic stop, the engine system performs a control of automatically restarting the engine 1. In the engine automatic stop, in order to increase a resistance force against the movement of the pistons 15 of the cylinders 11 respectively on the compression stroke and expansion stroke toward the TDC, a control is performed which adjusts the throttle valve 57 to a predetermined close state for a predetermined period of time during a stopping operation period of the engine 1 so that intake air amounts for at least the cylinders 11 are increased such that especially the cylinder 11 on the expansion stroke is supplied with a large amount of the intake air as much as possible.

When restarting the automatically stopped engine 1, the engine controller 100 (corresponding to the start controller) performs a restarting control of operating the starter motor 20 from a restart start timing of the engine 1 and performing the following combustion control.

Figure 5:
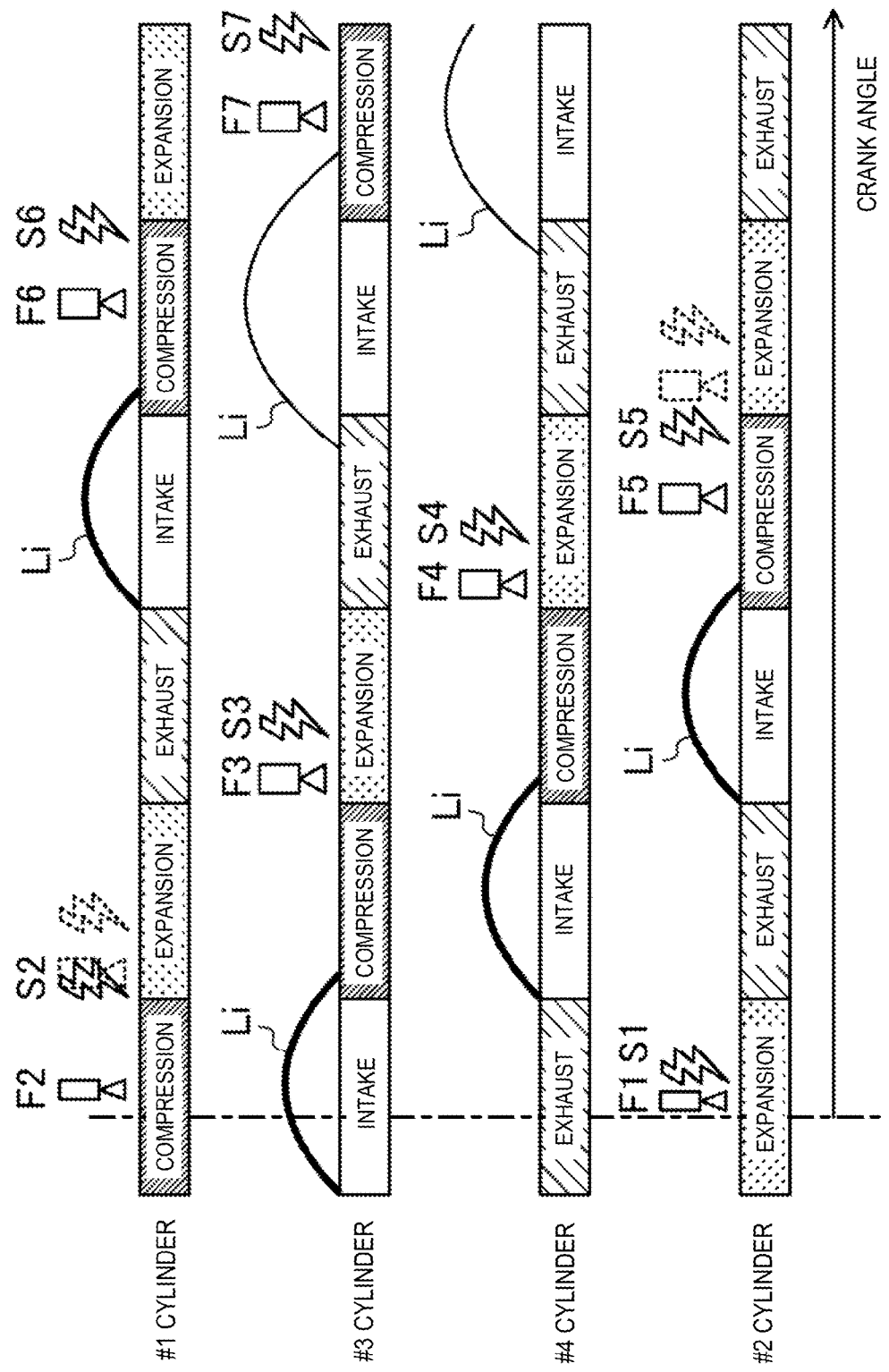
FIG. 5 is a schematic view illustrating cycles, lift curves of intake valves, fuel injection timings, and ignition timings of respective cylinders when automatically starting the engine in a high temperature state.
Figure 6:
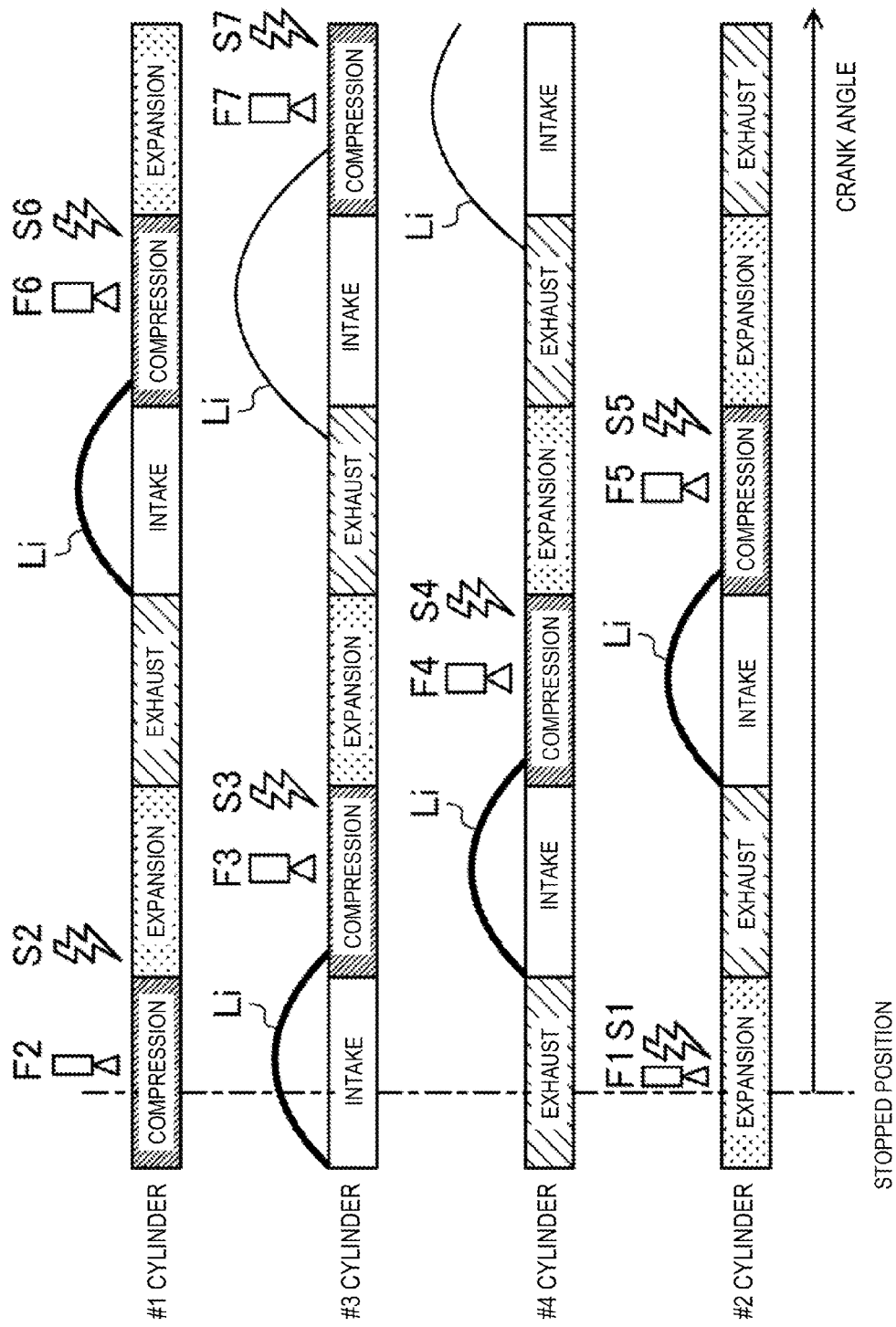
FIG. 6 is a schematic view illustrating the cycles, the lift curves of the intake valves, the fuel injection timings, and the ignition timings of the respective cylinders when automatically starting the engine in a low temperature state.

Hereinafter, the restarting control performed by the engine controller 100 is described in detail with reference to FIGS. 4 to 6. FIG. 4 illustrates one example of a change of the engine speed (upper chart) and the close timing of the intake valve 21 set by the intake valve phase variable mechanism 32 (lower chart), from the automatic stop, via the automatic start, to the automatic start completion of the engine 1. Moreover, FIG. 5 is a view illustrating cycles, lift curves of the intake valves 21, fuel injection timings, and ignition timings of the respective cylinders 11 when automatically starting the engine 1 in a high temperature state where the temperature of the engine 1 is higher than a predetermined temperature. FIG. 6 is a view illustrating the cycles, the lift curves of the intake valves 21, the fuel injection timings, and the ignition timings of the respective cylinders 11 when automatically starting the engine 1 in a low temperature state where the engine temperature is lower than the predetermined temperature. The predetermined temperature is suitably set to about 35 to 40° C., and in this embodiment, the temperature state of the engine 1 in the engine start is detected based on the engine water temperature detected by the water temperature sensor 78. Note that, instead of the engine water temperature, the temperature state of the engine 1 in the engine start may be detected based on a temperature of the engine oil (i.e., oil temperature).

First, as described above, after the engine 1 is automatically stopped due to the automatic stop condition of the engine 1 being satisfied, the drive of the oil pump 81 stops. Thus, the oil pressure supplied to the intake valve phase variable mechanism 32 becomes lower than the predetermined value. The intake valve phase variable mechanism 32 fixes the close timing of the intake valve 21 to the intermediate locked timing. Thus, as illustrated in FIG. 4, the close timing of the intake valve 21 is set on the BDC side with respect to the middle point of the compression stroke. Therefore, the effective compression ratio becomes comparatively high in the engine start. Moreover, since the oil in the HLA 303 is drained after the engine automatic stop, the HLA 303 becomes the sunken state, and when the engine automatic start begins, as indicated by the broken line in FIG. 4, the substantial close timing of the intake valve 21 is further advanced, and the effective compression ratio is further increased.

In the automatic start due to the automatic start condition of the engine 1 being satisfied, when the engine 1 is in the high temperature state in which the temperature is higher than the predetermined temperature, as illustrated in FIG. 5, fuel injections F1 and F2 are performed on the #2 cylinder and the #1 cylinder which are respectively on the expansion stroke and the compression stroke at the stopped timing of the engine 1. Then ignitions S1 and S2 are subsequently performed thereon to drive the engine 1 in the normal rotating direction. By performing the fuel injections and the combustions on the cylinders 11 on the expansion stroke and the compression stroke as described above, the prompt start of the engine 1 is achieved.

In the engine high-temperature start, for the #3 cylinder of which the first stroke after the first TDC in the engine is the compression stroke (i.e., the cylinder 11 which is on the intake stroke at the stopped timing of the engine 1) and the #4 cylinder (i.e., the cylinder 11 which is on the exhaust stroke at the stopped timing of the engine 1), the intake air with a comparatively high temperature is sucked thereinto and compressed, and also, as described above, the effective compression ratio is comparatively high due to the intake valve phase variable mechanism 32 fixing the close timing of the intake valve 21 to the intermediate locked timing and the sinking of the HLA 303. Therefore, a gas temperature and pressure in the end of the compression stroke are both increased. Performing the fuel injections on such #3 and #4 cylinders on the compression stroke may cause pre-ignition. Note that, each "Li" in FIG. 5 conceptually indicates the lift curve of the intake valve 21, in which each lift curve Li in the thick solid line indicates an example where the lift is reduced due to the sinking of the HLA 303 and the valve open period is shortened.

Thus, with the engine 1, in the high-temperature start, at least for the cylinder on the intake stroke at the stopped timing of the engine 1 (the #3 cylinder in FIG. 1), a timing of a fuel injection F3 is retarded to an early stage of the expansion stroke, and an ignition timing S3 is set to a timing in the early stage of the expansion stroke and after the fuel injection is completed. Note that, in the example of FIG. 5, also for the cylinder on the exhaust stroke at the stopped timing of the engine 1 (the #4 cylinder in FIG. 1), a timing of a fuel injection F4 is retarded to the early stage of the expansion stroke, and an ignition timing S4 is set to a timing in the early stage of the expansion stroke and after the fuel injection is completed. Here, the early stage of the expansion stroke may be the early stage when the expansion stroke is, for example, divided into four stages of early, early-middle, middle and final stages. Specifically, the start of the fuel injection may suitably be set within the range between 0 and 20° CA ATDC, for example, 10° CA ATDC. Thereby, the pre-ignition during the compression stroke is surely avoided. Additionally, since the temperature of the engine 1 is in the comparatively high state and also the effective compression ratio is comparatively high, even if the fuel is injected into the cylinder 11 at the timing in the early stage of the expansion stroke, the fuel can be smoothly vaporized and atomized.

Moreover, the ignition timing may be set based on the fuel injection start timing. For example, it may be set to the timing retarded from the fuel injection start timing by about 10 to 40° CA, such as 30° CA ATDC. As described above, since the fuel injected into the cylinder 11 is smoothly vaporized and atomized, the ignition timing can be advanced, which leads to advancing the combustion timing within the expansion stroke period and increasing the starting torque. This is advantageous in a prompt engine start.

By performing the first combustions of the #3 and #4 cylinders as described above, the intake air with the comparatively high temperature existing in, for example, the surge tank 55a in the engine start is sucked into the #3 and #4 cylinders, and as a result, the temperature of the intake air to be sucked into the #2 cylinder thereafter may decrease relatively. The temperature decrease leads to a decrease of the compression end temperature and is advantageous in suppressing the generation of pre-ignition. Thus, after a second fuel injection F5 of the #2 cylinder, the injection timing thereof may be set to be during the compression stroke instead of the early stage of the expansion stroke, and the ignition may be performed near the CTDC. In the example of FIG. 5, the injection timings of the fuel injection F5 of the #2 cylinder and the fuel injection F6 of the #1 cylinder are both set to the compression stroke.

Note that, when the compression end temperature is comparatively high and there is a possibility of causing pre-ignition if the fuel injection is performed on the compression stroke, as indicated by the broken line in FIG. 5, the fuel injection F5 and the ignition S5 may be maintained in a retarded state to be performed in the early stage of the expansion stroke.

Moreover, when the second fuel injection is performed on the #2 cylinder, the compression end temperature becomes lower compared to the first fuel injections on the #3 and #4 cylinders described above, and correspondingly the possibility of the pre-ignition occurring decreases. Thus, even in the case of maintaining the fuel injection F5 and the ignition S5 retarded to be performed in the early stage of the expansion stroke, the fuel injection F5 and the ignition S5 may be advanced closer to the CTDC. Thereby, the starting torque can be increased while avoiding pre-ignition, which is advantageous in the prompt engine start.

The retarding of the fuel injection and the ignition as described above may be determined whether to be maintained based on, for example, the temperature state of the engine 1 (i.e., the engine water temperature) at the start timing of the engine 1.

Further, once the oil pump 81 starts to drive due to the beginning of the engine start and then the intake valve 21 of each cylinder 11 opens once, as indicated by the broken line in FIG. 4, the sinking of the HLA 303 of each cylinder 11 is eliminated as the oil is supplied to the HLA 303, and thus, the valve clearance becomes zero. As a result, as indicated by each thin solid line in FIG. 5, the lift of the intake valve 21 is increased and the valve open period is extended. Thus, the substantially-advanced close timing of the intake valve 21 is retarded, and the effective compression ratio is correspondingly reduced. Therefore, after the sinking of the HLA 303 is eliminated, the retarding of the fuel injection and the ignition described above is canceled. In the example of FIG. 5, a second fuel injection F7 of the #3 cylinder corresponds to the fuel injection of which the retarding is canceled, and the fuel injection F7 is performed at a predetermined timing during the compression stroke and an ignition S7 is performed near the CTDC.

On the other hand, due to the drive of the oil pump 81, the hydraulic pressure higher than the predetermined value is supplied to the intake valve phase variable mechanism 32, which enables the operation of the intake valve phase variable mechanism 32. However, with the engine system of this embodiment, as illustrated in FIG. 4, even after the operation of the intake valve phase variable mechanism 32 is enabled, the intake valve phase variable mechanism 32 remains non-operated until the engine speed reaches N1 and the engine start is completed. Thus, the effective compression ratio is kept comparatively high in the engine automatic start, and as a result, the prompt engine start can be achieved. Note that, the close timing of the intake valve 21 may be further advanced particularly after the sinking of the HLA 303 is eliminated, instead of remaining the intake valve phase variable mechanism 32 non-operated. Thereby, the close timing of the intake valve 21 is not retarded even after the sinking of the HLA 303 is eliminated, and the effective compression ratio can be kept further higher.

Note that, in the engine automatic start described above, the starter motor 20 is driven; however, the drive of the starter motor 20 may be omitted.

Moreover, at the stopped timing of the engine 1, when the stopped position of the piston 15 of the cylinder on the compression stroke (the #1 cylinder in FIG. 5) is on the BDC side with respect to the middle point of the compression stroke, in the engine automatic start, the temperature inside the cylinder 11 increases significantly as the compression of the air inside the cylinder 11 which is in the middle of compression stroke process proceeds, and as described above, there is a possibility of causing pre-ignition if the fuel injection F2 is performed during the compression stroke. Therefore, the fuel injection timing of the #2 cylinder which is on the compression stroke at the stopped timing is set to the early stage of the expansion stroke as indicated by the broken line in FIG. 5, and the timing of the ignition S2 may be set to a timing in the early stage of the expansion stroke and after the fuel injection is completed. In this case, the torque generated when the engine start begins is reduced, therefore, the starter motor 20 is preferred to be driven to assist the engine start. Thereby, the prompt and secure engine start can be achieved.

In contrast with the control of automatically starting the engine 1 in the high temperature state as described above, when automatically starting the engine 1 in the low temperature state where the temperature of the engine 1 is lower than the predetermined temperature, the control illustrated in FIG. 6 is performed. Specifically, in the engine start in the low temperature state, similarly to the engine start in the high temperature state, due to the intake valve phase variable mechanism 32 fixing the close timing of the intake valve 21 to the intermediate locked timing and the sinking of the HLA 303, the close timing of the intake valve 21 is advanced and the effective compression ratio becomes comparatively high. Note that, in the low temperature state of the engine 1, since the temperature of the intake air to be sucked into the cylinder 11 is comparatively low, the compression end temperature is correspondingly reduced. Thus, pre-ignition does not easily occur even if the fuel is injected into the cylinder 11 during the compression stroke. On the contrary, if the fuel is injected in the early stage of the expansion stroke similarly to the engine high-temperature start, since the temperature of the cylinder 11 is low, this becomes disadvantageous in the vaporization and the atomization of the fuel. Note that, the low temperature state herein means the low temperature state under a condition of performing the engine automatic stop.

Thus, in the low-temperature state, the retarding of the fuel injection and the ignition described above is not performed. Specifically, as illustrated in FIG. 6, first, the fuel injections F1 and F2 are performed respectively at predetermined timings on the #2 and #1 cylinders which are respectively on the expansion stroke and the compression stroke at the stopped timing of the engine 1. Then the ignitions 51 and S2 are subsequently performed thereon to drive the engine 1 in the normal rotating direction.

Then, for the #3 and #4 cylinders respectively on the intake stroke and the exhaust stroke at the stopped timing of the engine 1, differently from the high-temperature start, the fuel injections F3 and F4 are performed respectively at predetermined timings on the compression stroke and the ignitions are performed near the CTDC. This is similar for the second fuel injection F5 and thereafter and the second ignition S5 and thereafter in the #2 cylinder, and for the second fuel injection F6 and thereafter and the second ignition S6 and thereafter in the #1 cylinder. Such fuel injection timings may each be set suitably between, for example, 90 and 60° CA BTDC, such as 70° CA BTDC. Thus, the engine low-temperature start is, by advancing the fuel injection timing and the ignition timing compared to the engine high-temperature start, advantageous in increasing the starting torque while avoiding pre-ignition, which is also advantageous in the prompt engine start. Moreover, the fuel injection F7 and the ignition S7 after the sinking of the HLA 303 is eliminated are set to the predetermined timings on the compression stroke, similarly to the engine high-temperature start.

Moreover, similarly to the engine high-temperature start, the intake valve phase variable mechanism 32 may maintain the close timing of the intake valve 21 to the intermediate locked timing until the engine start is completed, and after the sinking of the HLA 303 is eliminated for example, the intake valve phase variable mechanism 32 may advance the close timing of the intake valve 21 so as to keep the high effective compression ratio and improve the starting performance in the engine low-temperature start.

Note that, in the above description, the retarding of the fuel injection and the ignition is applied to the automatic start of the engine 1; however, the retarding technique can also be applied to a force start in which the engine 1 is started due to a key-on operation by a driver.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

DESCRIPTION OF REFERENCE NUMERALS

1 Engine
100 Engine Controller (Starter)
11 Cylinder
15 Piston
20 Starter Motor
30 Intake Valve Drive Mechanism
303 HLA (Hydraulic Lash Adjuster)
32 Intake Valve Phase Variable Mechanism
51 Ignition Plug
53 Fuel Injection Valve
81 Oil Pump (Hydraulic Pressure Supply Source)

What is claimed is:

1. A starting device of a spark-ignition multi-cylinder engine, comprising:
a multi-cylinder engine body including a plurality of cylinders each having a piston reciprocatably fitted therein;
fuel injection valves for injecting fuel into the respective cylinders;
ignition plugs for igniting mixture gas inside the respective cylinders;
an intake valve drive mechanism for opening and closing intake valves for introducing intake air into the respective cylinders, synchronized with the reciprocations of the respective pistons;
a hydraulic variable valve phase mechanism for changing a close timing of each of the intake valves between a predetermined most advanced timing and a predetermined most retarded timing after an intake bottom dead center;
an engine-driven hydraulic pressure supply source for supplying a predetermined hydraulic pressure to the variable valve phase mechanism; and
a start controller for controlling the fuel injection valves, the ignition plugs, and the variable valve phase mechanism in an engine start,
wherein when the supplied hydraulic pressure is lower than a predetermined value, the variable valve phase mechanism locks the close timing of the intake valve to a predetermined timing that is between the most advanced timing and the most retarded timing and enables a cold start of the engine;
wherein when the engine in the engine start is in a high temperature state in which a temperature thereof is higher than a predetermined temperature, the start controller performs retard-setting on the cylinder that is on intake stroke at an engine stopped timing among the plurality of cylinders to set a fuel injection timing thereof to an early stage of expansion stroke, and the start controller retards an ignition timing of the cylinder to a timing in the early stage of the expansion stroke and after the fuel injection is completed, and
wherein even after the engine start begins and the hydraulic pressure supplied to the variable valve phase mechanism exceeds the predetermined value, the start controller performs non-retard-setting on the intake valve to set the close timing thereof to the predetermined timing or earlier until the engine start is completed.

2. The starting device of claim 1, further comprising a starter motor for cranking the engine,
wherein when the engine in the engine start is in the high temperature state and a piston stopped position of the cylinder that is on compression stroke at the engine stopped timing is on a bottom dead center side with respect a middle point of the compression stroke, the start controller performs retard-setting on the cylinder that is on the compression stroke among the plurality of cylinders to set a fuel injection timing thereof to a timing in the early stage of the expansion stroke and after a compression top dead center, and the start controller retards an ignition timing of the cylinder to a timing in the early stage of the expansion stroke and after the fuel injection is completed, and
wherein the start controller also drives the starter motor.

3. The starting device of claim 2, wherein the intake valve drive mechanism has a hydraulic lash adjuster for adjusting a valve clearance of the intake valve by being supplied with the hydraulic pressure from the hydraulic pressure supply source, and
the start controller cancels the retard-setting of the fuel injection timing after the engine start begins and oil is supplied to the hydraulic lash adjuster.

4. The starting device of claim 3, wherein after the engine is automatically stopped under a predetermined condition, the start controller performs the retard-setting of the fuel injection timing and the non-retard-setting of the close timing of the intake valve when automatically starting the engine due to a satisfaction of a predetermined condition.

5. The starting device of claim 2, wherein the start controller keeps the close timing of the intake valve to the predetermined timing until the engine start is completed.

6. The starting device of claim 2, wherein after the engine is automatically stopped under a predetermined condition, the start controller performs the retard-setting of the fuel injection timing and the non-retard-setting of the close timing of the intake valve when automatically starting the engine due to a satisfaction of a predetermined condition.

7. The starting device of claim 1, wherein the intake valve drive mechanism has a hydraulic lash adjuster for adjusting a valve clearance of the intake valve by being supplied with the hydraulic pressure from the hydraulic pressure supply source, and
the start controller cancels the retard-setting of the fuel injection timing after the engine start begins and oil is supplied to the hydraulic lash adjuster.

8. The starting device of claim 7, wherein the start controller keeps the close timing of the intake valve to the predetermined timing until the engine start is completed.

9. The starting device of claim 7, wherein after the engine is automatically stopped under a predetermined condition, the start controller performs the retard-setting of the fuel injection timing and the non-retard-setting of the close timing of the intake valve when automatically starting the engine due to a satisfaction of a predetermined condition.

10. The starting device of claim 1, wherein the start controller keeps the close timing of the intake valve to the predetermined timing until the engine start is completed.

11. The starting device of claim 1, wherein after the engine is automatically stopped under a predetermined condition, the start controller performs the retard-setting of the fuel injection timing and the non-retard-setting of the close timing of the intake valve when automatically starting the engine due to a satisfaction of a predetermined condition.

* * * * *